United States Patent [19]

Park

[11] Patent Number: 5,772,244
[45] Date of Patent: Jun. 30, 1998

[54] AUTOMOBILE STEERING SHAFT MOUNTING SYSTEM

[75] Inventor: Chun Woo Park, Ulsan-si, Rep. of Korea

[73] Assignee: Hyundai Motor Company, Seoul, Rep. of Korea

[21] Appl. No.: 727,929

[22] Filed: Oct. 9, 1996

[30] Foreign Application Priority Data

Oct. 18, 1995 [KR] Rep. of Korea ...................... 95-36012

[51] Int. Cl.[6] ....................................... B62D 1/16
[52] U.S. Cl. .............................. 280/780; 280/779; 74/492
[58] Field of Search .................................. 280/779, 780; 74/492

[56] References Cited

U.S. PATENT DOCUMENTS

| 1,572,519 | 2/1926 | Davis ...................................... 280/780 |
|---|---|---|
| 1,820,220 | 8/1931 | Geyer ...................................... 280/780 |
| 3,300,229 | 1/1967 | Kishline ................................... 280/780 |
| 4,372,577 | 2/1983 | Adickes .................................... 280/780 |
| 4,517,854 | 5/1985 | Kawabata et al. ......................... 280/780 |

Primary Examiner—Kenneth R. Rice
Attorney, Agent, or Firm—Birch, Stewart, Kolasch & Birch, LLP

[57] ABSTRACT

Disclosed is an automobile steering shaft mounting system which includes a support plate, fixed to a car body and having support member extending on its four corners; a bracket, which cups around a steering shaft and is able to be connected with the support members and move toward and away from the car body in a fixed sphere; cams, mounted to both sides of a fixed axis and can move the bracket toward and away from the car body to connect and disconnect with the support members; and an actuator, controlled by an electronic control unit when the ECU receives signals from an engine rotation sensor, and which rotates the cams according to the inputted signals.

7 Claims, 5 Drawing Sheets

AUTOMOBILE STEERING SHAFT MOUNTING SYSTEM

BACKGROUND

The present invention relates to an automobile steering shaft mounting system and, more particularly, to an automobile steering shaft mounting system which minimizes vibration to a steering wheel caused by resonance when an engine is idling.

In automobile steering devices, when the steering wheel is turned, this steering power is transmitted to front wheels through a steering gear, and a plurality of linkages to turn the front wheels, allowing for the steering of the automobile.

As shown in FIG. 6, a steering shaft 100 of the above steering device is mounted to a car body 104 through brackets 102. The brackets 102 are formed facing each other on two sides of the steering shaft 100, and the upper part (as shown in the drawing) of the brackets 102 are fixed to the car body 104.

However, in the above steering shaft, as the brackets are interposed between the steering shaft and car body, directly connecting the two, the resonance phenomenon that results when the engine is idling is directly transmitted to the steering shaft, which results in the intense vibration of the steering wheel.

SUMMARY

The present invention has been made in an effort to solve the above problem.

It is an object of the present invention to provide an automobile steering shaft mounting system that minimizes vibration to a steering wheel caused by resonance when an engine of an automobile is idling.

To achieve the above object, the present invention provides an automobile steering shaft mounting system which includes a support plate, fixed to a car body and having support members extending from two of its sides; a bracket, which cups around a steering shaft, is disposed on the outside of the support members, and is able to move toward or away from the car body in a fixed sphere; cams, mounted to both sides of a fixed axis and which can move the bracket toward and away from the car body to connect and disconnect with the support members; and an actuator, controlled by an electronic control unit when the ECU receives signals from an engine rotation sensor, and which rotates the cams according to the inputted signals.

BRIEF DESCRIPTION OF THE DRAWINGS

These and other features, aspects, and advantages of the present invention will become better understood with regard to the following description, appended claims, and accompanying drawings where:

DESCRIPTION

Reference will now be made in detail to the present preferred embodiment of the invention, an example of which is illustrated in the accompanying drawings. Wherever possible, the same reference numbers will be used throughout the drawings to refer to the same or like parts.

Figure 1:
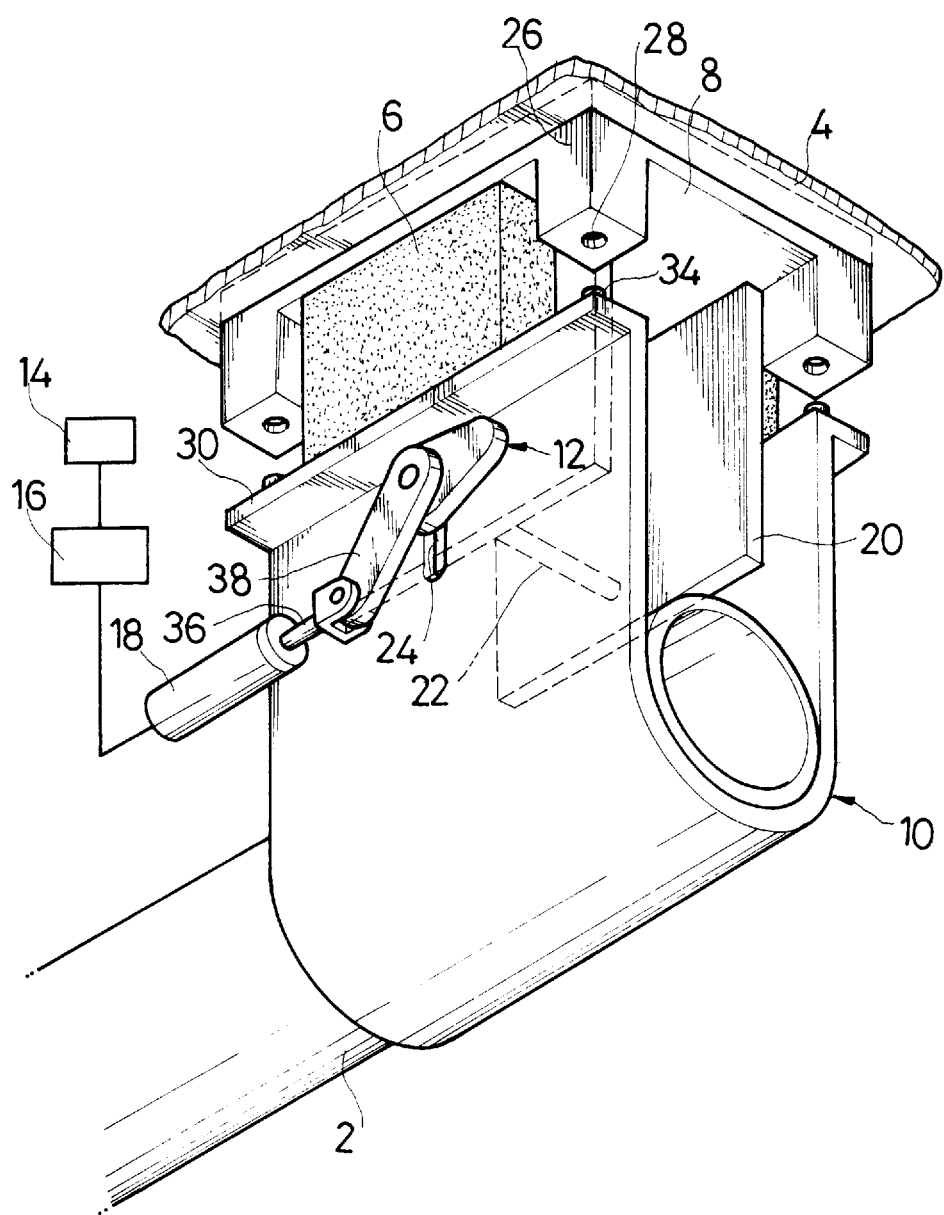
FIG. 1 is an enlarged perspective view of an automobile steering shaft mounting system in accordance with a preferred embodiment of the present invention.
Figure 2:
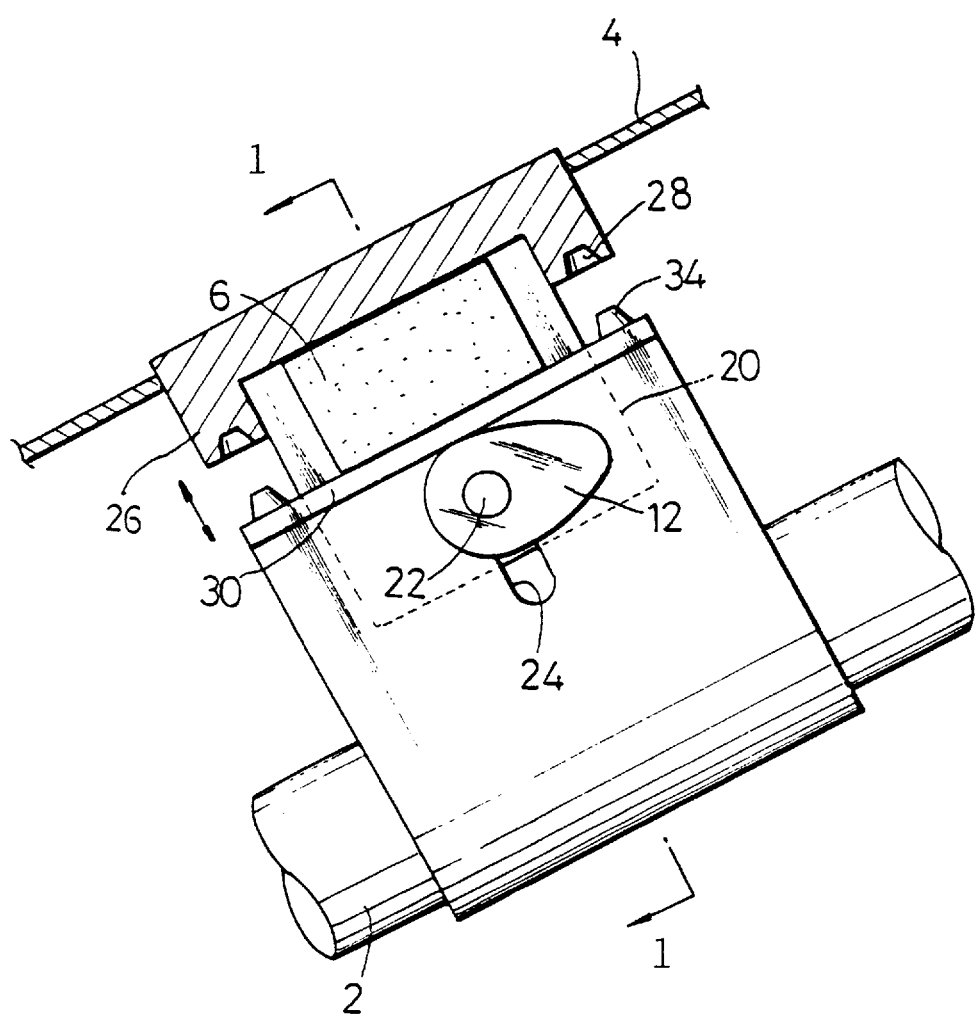
FIG. 2 is a side view of FIG. 1.
Figure 3:
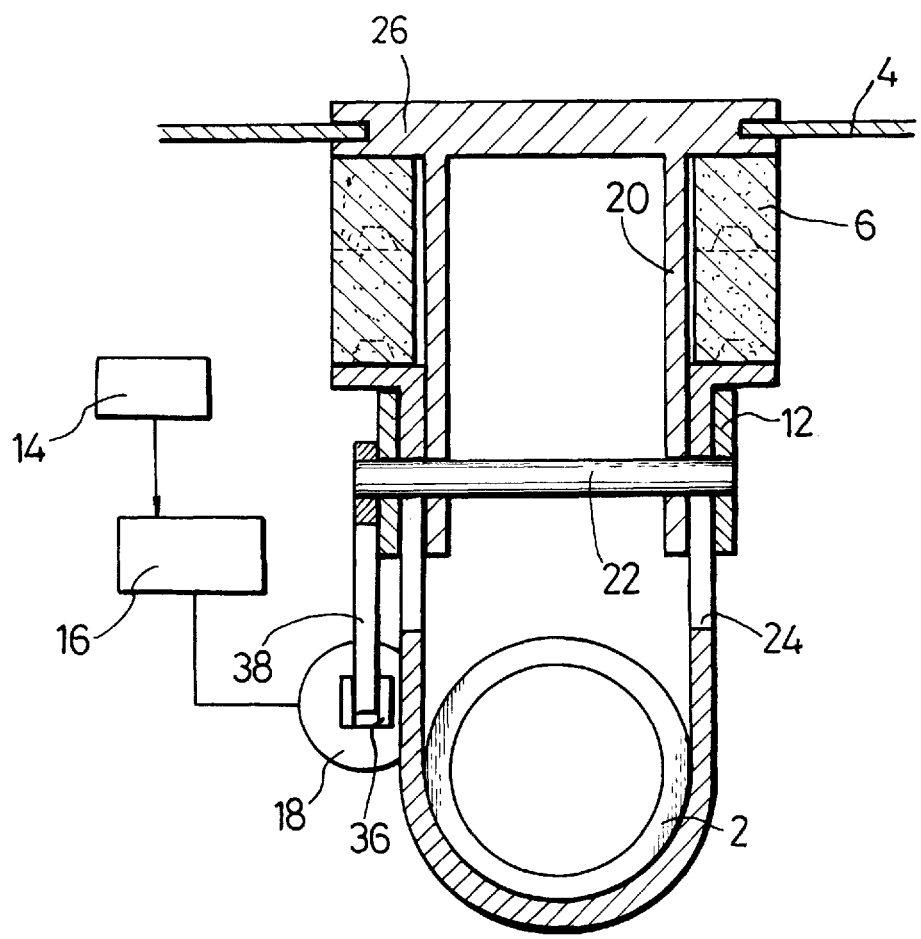
FIG. 3 is a sectional view taken along line A—A of FIG. 2.

FIGS. 1–3 illustrate a preferred embodiment of the present invention and reference numeral 2 refers to a steering shaft.

A steering wheel (not shown) is mounted to one end of the steering shaft 2, and when the steering wheel is turned by a driver, the steering of an automobile is made possible through a gear box and a linkage (not shown), both mounted to the other end of the steering shaft 2.

In the present invention, elastic members 6, of rubber-like material having elasticity, are interposed between the steering shaft 2 and a car body 4. The steering shaft 2 is mounted to the car body 4 with this interposition of the elastic members 6.

That is, the elastic members 6 are interposed between a support plate 8 fixed to the car body 4, and a bracket 10, which is U-shaped and cups around the steering shaft 2. The steering shaft 2 is able to be directed toward and away from the car body 4 by cams 12, which operate according to the number of revolutions of an engine. The cams 12 are driven by an actuator 18 which, in turn, is controlled by an electronic control unit (ECU) 16 that acts according to signals inputted from an engine RPM sensor 14. The engine RPM sensor 14 detects the number of revolutions of the engine.

The cams 12 are mounted to both ends of a fixed axis 22 which passes through support members 20 that extend from the support plate 8. The fixed axis 22, before being connected to the cams 12, also passes through elongated holes 24 which are formed vertically at a fixed length in the bracket 10.

The support plate 8 has extended parts 26 formed in its corners, and grooves 28 are formed on the faces of the extended parts 26.

Also, the elastic members 6 are mounted in the space between the front and rear extending parts 26, and the support members 20 are formed on the inside of the elastic members 6.

Furthermore, folded parts 30, folded extending away from the support members 20, are formed on free ends of the bracket 10 so that they face the extended part 26. Protrusions 34 are formed on the face of the folded parts 30 which face the extended part 26. These protrusions 34 are formed opposite the grooves 28 and are able to be inserted into the grooves 28.

Although the bracket 10 has thus far been described as being U-shaped, it is not limited to this shape and can be made of two flat members in which portions farthest from the car body 4 are fixed to the steering shaft 2 and folded parts 30 are formed on its free ends.

A connecting link 38 is fixed to one of the cams 12 and it is interposed between an operation rod 36 of the actuator 18 and the cam 12. The connecting link 38 rotates the fixed shaft 22. When the operation rod 36 is elongated by the operation of the actuator 18, the cams 12 rotate and push the bracket 10 toward the car body 4 by pushing on the folded parts 30, and the bracket 10 comes to be directly connected with the car body 4.

In the present invention structured as in the above, when the engine is at an idling state (about 750±50 RPMs), this is detected by the engine RPM sensor 14 and sends a signal to the ECU 16.

Figure 4:
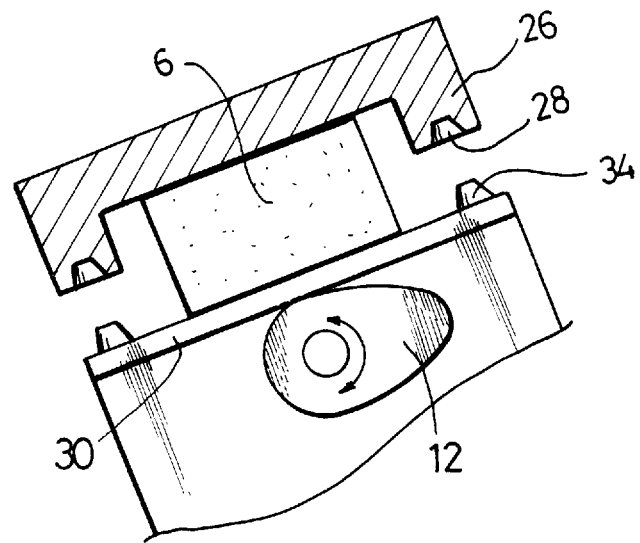
FIG. 4 is a view showing the present invention when an engine is in an idling state.
Figure 5:
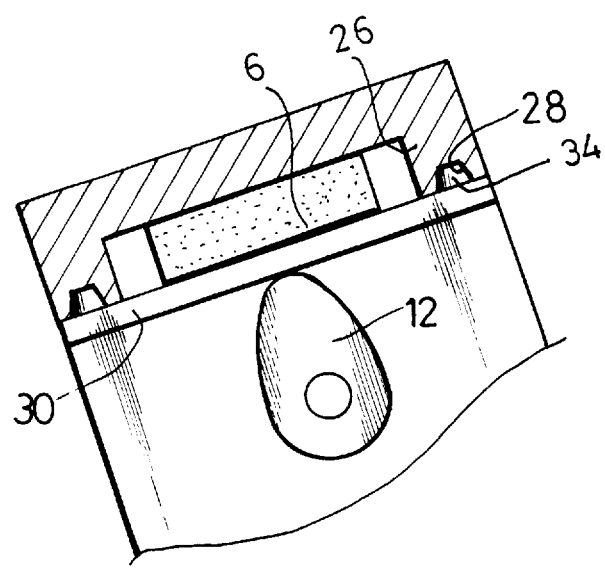
FIG. 5 is a view showing the present invention when an automobile is in a normal driving state.
Figure 6:
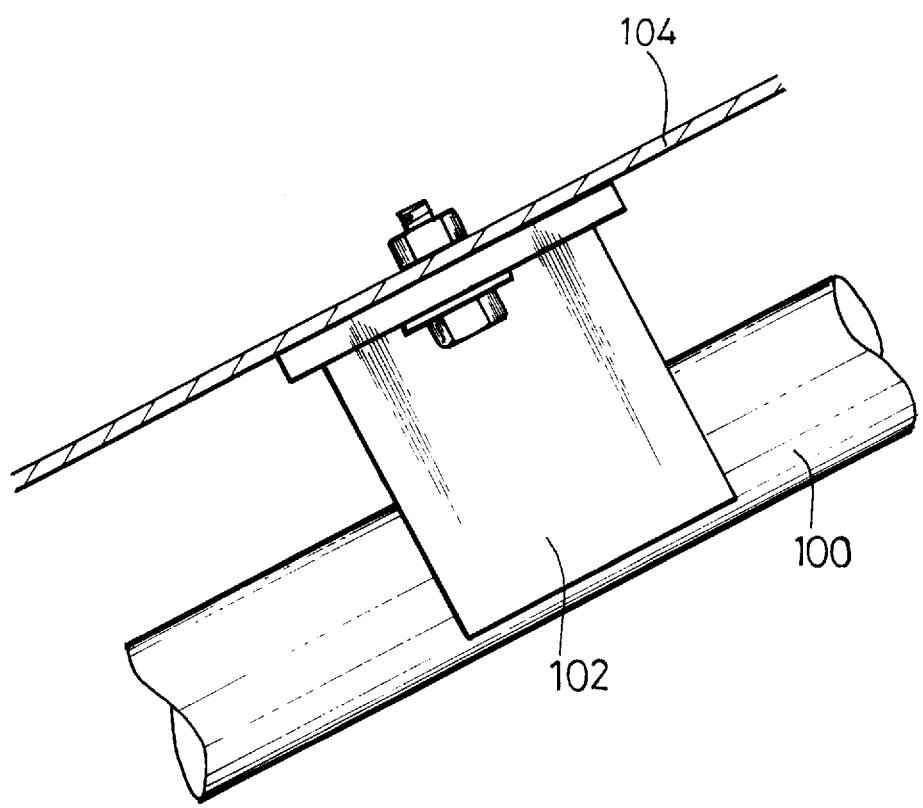
FIG. 6 is a view of steering shaft of the steering device mounted on a car body.

Next, the electronic control unit 16 makes it so the cams 12 rotate to the right when viewed in FIG. 4 to release the upward pressure to the bracket 10.

If this is done, the support plate 8 and bracket 10 are separated from each other by the elasticity of the elastic member 6, and the steering shaft 2 is connected to the car body 4 by only the elastic member 6.

When the bracket 10 is in this position, resonance of the car body 4 caused by revolutions of the engine is offset by the elastic member 6, and because the steering shaft 2 is connected to the bracket 10 (and not directly to the car body 4) in an idling state, it is not influenced by this resonance, and vibrations are not created in the steering shaft 2.

Next, when the automobile is driven, the RPMs increase. This increase in engine revolutions is detected by the engine RPM sensor 14 and a signal is inputted to the ECU 16 by the engine RPM sensor 14.

After the ECU 16 receives this signal, it drives the actuator 18 and the cams 12 push the bracket 10 toward the car body 4. When the bracket is in this position, the elastic member 6 is compressed, and the support plate 8 and bracket 10 come to be in contact with each other.

When this is done, the protrusions 34 of the folded parts 30 are in a state where they are inserted in the grooves 28 of the extension parts 26, and movement between the support plate 8 and bracket 10 does not occur.

If the steering shaft 2 and car body 4 are directly connected in this manner, as resonance is not created in the car body 4, the steering wheel is not vibrated.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. An automobile steering shaft mounting system comprising:

a bracket which supports a steering shaft;

elastic members which elastically connects said bracket with a car body and which absorbs resonance transmitted from the car body; and means for directly connecting the bracket to the car body according to RPMs of an engine.

2. The automobile steering shaft mounting system of claim 1, wherein said means for directly connecting the bracket to the car body includes:

an engine RPM sensor;

an electronic control unit which handles signals received from the RPM sensor;

a support plate, fixed to a car body and having support members extending on two of its sides;

a bracket, which cups around a steering shaft, is disposed on the outside of the support members, and is able to move toward or away from the car body in a fixed sphere;

cam means, controlled by engine revolutions detected in said RPM sensor and which directly connects or disconnects said bracket and said support members of the support plate.

3. The automobile steering shaft mounting system of claim 2, wherein elastic members are mounted between the support plate and bracket.

4. The automobile steering shaft mounting system of claim 2, wherein elongated holes are vertically formed where the fixed axis passes through the bracket, allowing the bracket to move toward and away from the car body and be connected to the support members.

5. The automobile steering shaft mounting system of claim 2, wherein the extended parts having grooves are formed on the support plate and protrusions are formed on the bracket.

6. The automobile steering shaft mounting system of claim 2, wherein said cam means includes an actuator, controlled by the electronic control unit, and cams which are operated by the actuator.

7. The automobile steering shaft mounting system of claim 6, wherein the cams are rotated by of an operation rod of the actuator and a connecting link, connected to the fixed axis.

* * * * *